United States Patent [19]

Leverich

[11] 4,172,278
[45] Oct. 23, 1979

[54] DC TO AC INVERTER
[75] Inventor: Charles G. Leverich, Skokie, Ill.
[73] Assignee: Circom, Inc., Bensenville, Ill.
[21] Appl. No.: 932,005
[22] Filed: Aug. 8, 1978

Related U.S. Application Data

[63] Continuation of Ser. No. 745,302, Nov. 26, 1976, abandoned.

[51] Int. Cl.² .......................................... H02M 7/515
[52] U.S. Cl. .................................................. 363/139
[58] Field of Search ................ 307/252 M; 363/27, 28, 363/139

[56] References Cited

U.S. PATENT DOCUMENTS

| | | | |
|---|---|---|---|
| 3,181,053 | 4/1965 | Amato | 363/139 |
| 3,263,153 | 7/1966 | Lawn | 363/139 |
| 3,916,290 | 10/1975 | Rao et al. | 363/135 |
| 3,942,094 | 3/1976 | Akamatsu | 363/128 |

FOREIGN PATENT DOCUMENTS

| | | | |
|---|---|---|---|
| 45-5284 | 2/1970 | Japan | 363/139 |
| 478481 | 10/1969 | Switzerland | 307/252 M |

*Primary Examiner*—William M. Shoop
*Attorney, Agent, or Firm*—Wegner, Stellman, McCord, Wiles & Wood

[57] ABSTRACT

A full wave DC to AC inverter having two SCR inverter switches which alternately conduct to connect a DC source across one section or the other of a center tapped power transformer primary to establish an alternating current in the secondary. A commutating circuit includes a single capacitor which is charged during the conduction of the inverter switches and is alternately connected to the conducting inverter switch to turn it off. The commutating circuit employs a single transformer which has a primary winding connected in series with the primary winding of the power transformer and a secondary winding connected through an SCR and to the capacitor. A pair of SCR's, which are gated on by commutation trigger circuits, control the discharge of the capacitor to the appropriate SCR inverter switch. Time delay and pulse circuits provide successive gating pulses to the SCR inverter switches to assure turn-on after an established preset time delay so that the commutation trigger circuit turns off the conducting SCR inverter switch before the other inverter switch is turned on.

11 Claims, 4 Drawing Figures

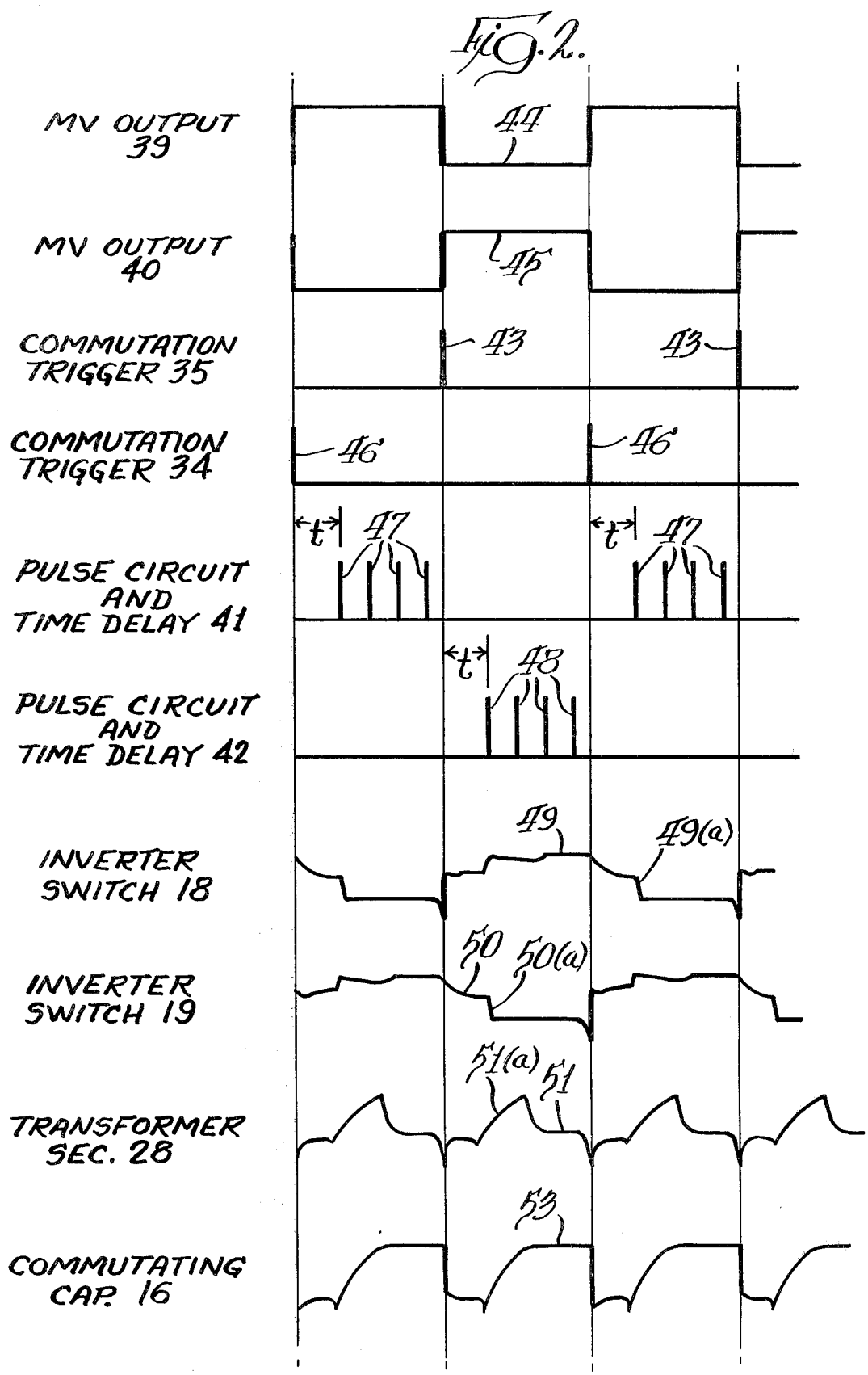

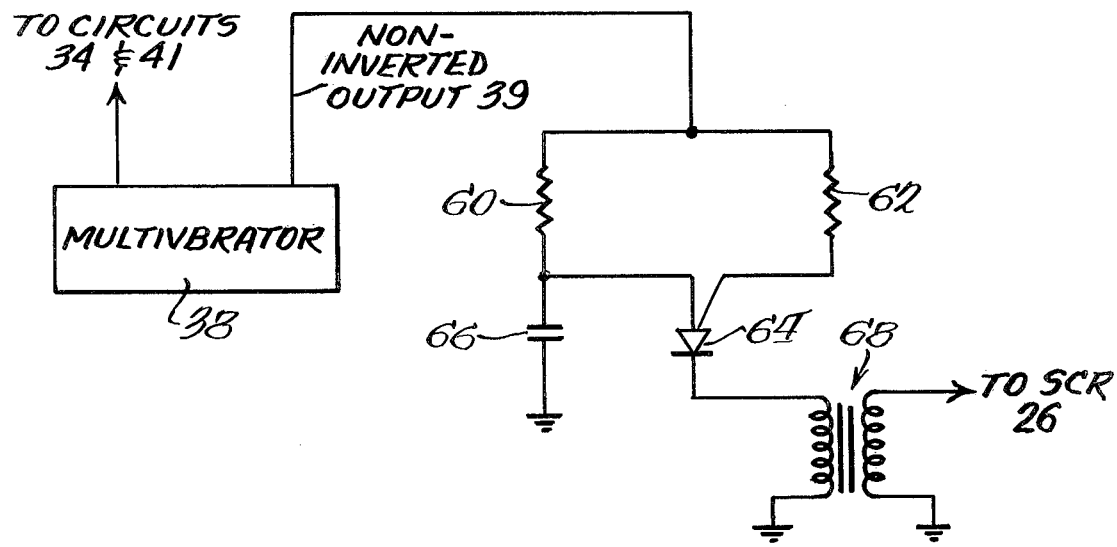
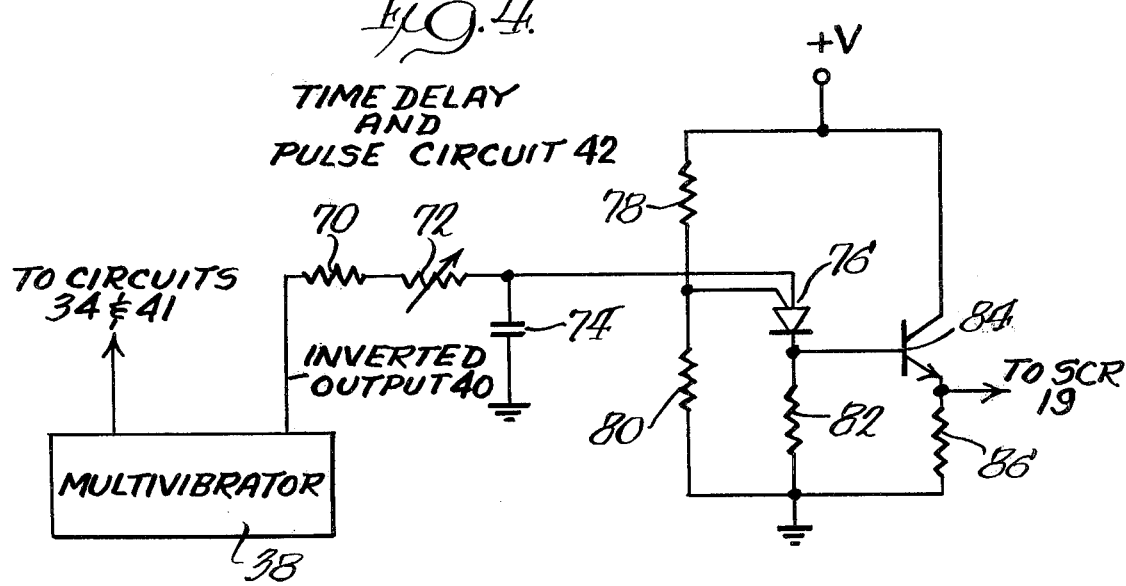

DC TO AC INVERTER

This is a continuation of application Ser. No. 745,302 filed Nov. 26, 1976, now abandoned.

BACKGROUND OF THE INVENTION

This invention relates to DC to AC inverter circuits and, more particularly, to inverter circuits capable of providing AC power to loads having various impedance characteristics.

Full wave DC to AC inverter circuits are known. One such circuit, having two SCR inverter switches and operating into the center tapped primary winding of a transformer, is illustrated in the General Electric SCR Manual, Third Edition, copyright 1964, FIG. 9.2.5, page 161. Each of the inverter SCR's is alternately turned on by timing signals. Self-commutating circuitry is relied on to turn off the conducting SCR switch when the other is turned on. The self-commutating circuitry does not perform reliably, and both inverter switches sometimes conduct at the same time.

A principal feature of this invention is the provision of a full wave inverter having a positively acting commutating circuit which ensures shut-off of the appropriate SCR inverting switch. Pulse circuits provide gate pulses which alternately actuate each of the inverter switches and commutation trigger circuits control the discharge of the commutating capacitor across the SCR inverting switches.

Another feature of the invention is that a single commutating capacitor is connected to both inverter switches and is charged during conduction of the switch with an amount of energy that is directly related to the load on the inverter.

A further feature is that the system is light in weight because the number of transformers and capacitors is minimized.

Further features and advantages of the invention will be readily apparent from the following specification and from the drawings.

BRIEF DESCRIPTION OF THE DRAWINGS

FIG. 2 is a series of voltage waveforms useful in considering the operation of the circuit;

FIG. 3 is a schematic diagram of the commutation trigger circuit; and

FIG. 4 is a schematic diagram of the time delay and pulse circuit.

DESCRIPTION OF PREFERRED EMBODIMENT

Figure 1:
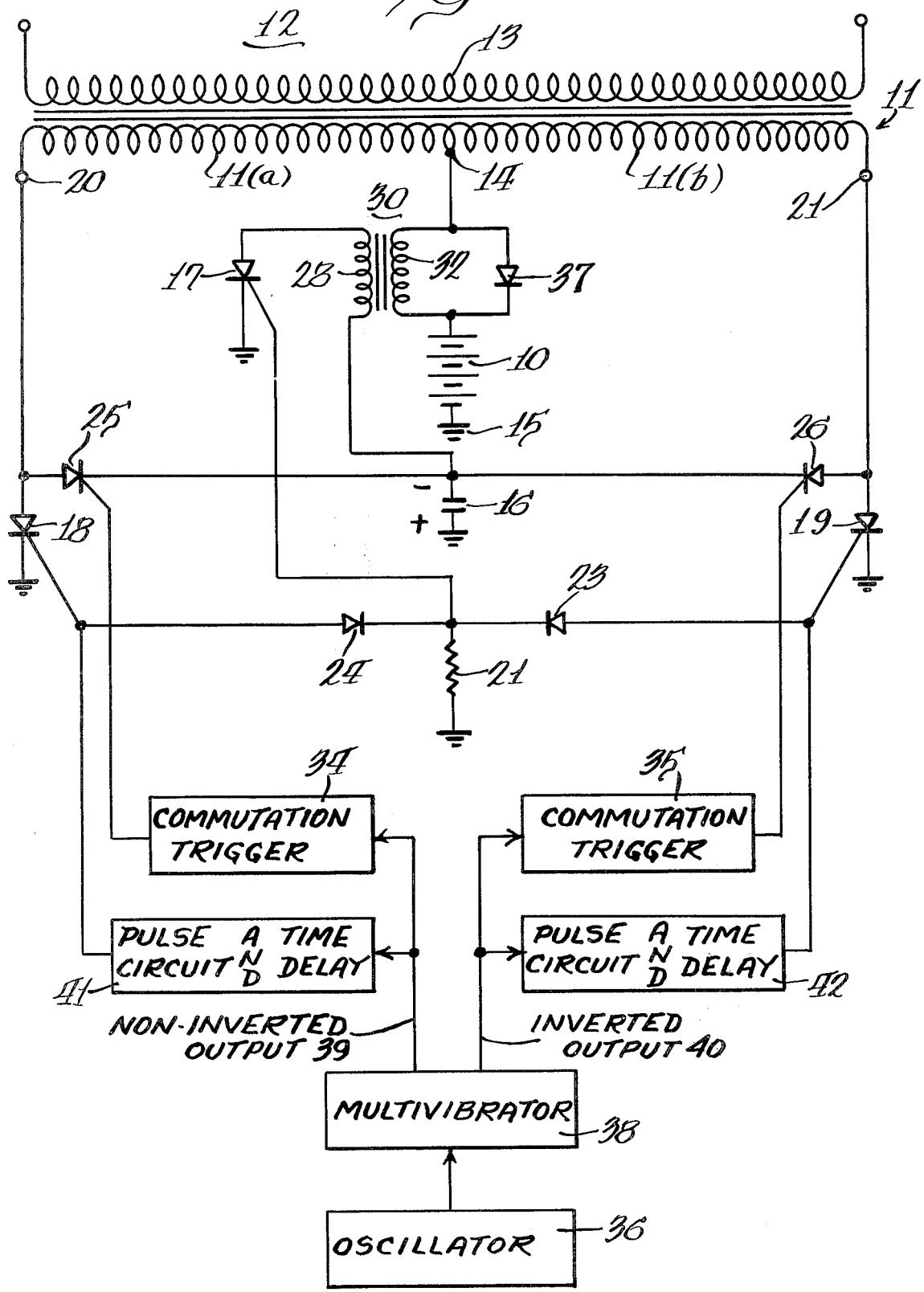
FIG. 1 is a schematic diagram of an embodiment of the invention.

During the course of the description of the circuit, specific component types and values will be given for various circuit elements and specific timing relationships will be described. This detailed information is included in the specification for the purpose of disclosing an operative embodiment of the invention. The components and timing relationships are for an inverter having a 12 volt DC input and a 110 volt, 60 Hz output, with a continuous power rating of one kilowatt and a peak power capability in excess of 5 kilowatts. An inverter with different characteristics or specifications might use different components.

The inverter and other various switches are disclosed and described herein as silicon-controlled rectifiers (SCR's). Other gate-controlled unidirectional conducting semiconductor devices might be used, depending upon the current and voltage requirements of a particular system.

FIG. 1 shows an inverter circuit for changing DC energy from a battery 10 to alternating current energy in the transformer secondary winding 13. Transformer primary winding 11 is center tapped and the battery 10 (as a 12 volt storage battery) has one terminal coupled to center tap 14 through transformer 30 and the other terminal returned to an electrical reference or ground 15. The positive terminal of battery 10 is shown coupled to center tap 14 and the negative terminal connected with ground 15. The connection of the battery could be reversed, but the polarities of the various other circuit elements would then also be reversed.

A pair of SCR inverter switches 18 and 19, both GE C154A, are each connected between the end terminals 20 and 21, respectively, of primary winding 11 and ground. The inverter switches alternately conduct to create the desired waveform on the output, secondary winding 13, by directing the current flow through winding 11 of transformer 12.

A commutating circuit assures turn-off of the conducting inverter switch. The circuit includes an SCR commutating capacitor charging switch 17, GE C30B, having its anode connected through secondary winding 28 of transformer 30. Commutating capacitor 16, 100μf, is connected in series with SCR commutating capacitor charging switch 17 and winding 28. The commutating capacitor 16 charges when switch 17 is conductive. The capacitor alternately discharges across inverter switches 18 and 19 when the respective commutation control switch, 25 or 26, is conductive.

The basic timing element for the inverter is an oscillator 36 which operates at a frequency which is twice that of the desired output frequency (e.g., 120 Hz for an inverter output of 60 Hz). The output from the oscillator 36 is connected to a frequency dividing multivibrator 38 which has two outputs 30 and 40, both at 60 Hz and 180° out of phase with each other. Details of the oscillator and the multivibrator form no part of the invention, and specific circuits are not illustrated. The oscillator may, for example, take the form of a unijunction transistor relaxation oscillator. The multivibrator may be a typical bistable multivibrator.

Multivibrator output 39 is connected to pulse circuit and time delay 41, which provides a gate signal for the first inverter switch 18 to turn it on after a predetermined delay time t. Inverted output 40 is connected with pulse circuit time delay 42 which provides a gate signal for the second inverter switch 19. The signal from circuits 41 and 42 consists of a plurality of pulses to assure turn-on of inverter switches 18 and 19. The signal is also applied to the gate of commutating capacitor charging switch 17 across resistor 21, 100 ohms, through isolation diodes 23 and 24, 1N 4001. The diodes prevent interaction between the gates of the inverter switches. For example, a positive turn-on signal applied to inverter switch 19 from circuit 42 also turns on commutating capacitor charging switch 17, but current flow is inhibited to the opposite inverter switch 18 by diode 24.

Multivibrator output 39 is also connected to commutation trigger 34 which controls commutation control switch 25 to ensure that inverter switch 18 ceases conduction before inverter switch 19 is gated on. Commutation trigger 35, provided inverted output 40, similarly controls commutation control switch 26.

A cycle of operation will now be discussed. Briefly, assuming that the inverter switch 18 is first to conduct, the current through section 11 (a) of the primary winding of transformer 12 flows also through the primary winding 32 of commutating capacitor charging transformer 30. When inverter switch 18 and commutating capacitor charging switch 17 are turned on, the initial current flow induces a current in the secondary winding 28 which charges capacitor 16 with the indicated polarity. As commutation control switches 25 and 26 are not conducting, the charge is held on commutating capacitor 16. At the end of the conduction period for inverter switch 18, which period approximately equals the period of time of one-half cycle of the alternating output, commutation control switch 25 is gated on by commutation trigger circuit 34 and commutating capacitor 16 is discharged across inverter switch 18. The voltage applied by the capacitor to the inverter switch 18 causes it to cease conduction.

Following the turn-off of inverter switch 18 and the established delay time t, a pulse from circuit 42 turns on the second inverter switch 19 and commutating capacitor charging switch 17 through isolating diode 23. Current from source 10 flows through section 11(b) of transformer primary winding 11 inducing an opposite polarity of the output in secondary winding 13. The initial current flow through primary winding 32 of transformer 30 induces a current in secondary winding 28 which again charges commutating capacitor 16. At the end of the half cycle, commutation control switch 26 is gated on, connecting commutating capacitor 16 across inverter switch 19, causing it to cease conduction. Any voltage induced in primary winding 32 of transformer 30 is dissipated by diode 37, I.R. 20F5, when the primary current through output transformer 12 ceases to flow.

The turn-off of second inverter switch 19 completes a cycle of operation and is followed by generation of a gating pulse to turn on first inverter switch 18.

It should be noted that the commutating capacitor 16 is charged with energy which is a direct function of the load on the inverter. This ensures complete turn-off of the conducting inverter SCR even with a short circuit across secondary winding 13. When the load is small, the commutating energy utilized is reduced, enhancing the efficiency of the inverter.

Representative waveforms for the inverter are illustrated in FIG. 2. The output of the oscillator 36 is not shown, but it provides a signal having a frequency which is twice the frequency of desired output or 120 Hz for a 60 Hz inverter. Multivibrator output 39 is represented by waveform 44 and inverted output 40 is represented by waveform 45. These are square waves, similar in form, but 180° out of phase and at a frequency one-half that of oscillator 36. During the positive half cycle of multivibrator noninverted output 39, pulse circuit and time delay 41 is operative. Following an initial preset delay t, a series of gate pulses 47 are generated to turn on inverter switch 18. The delay time t is selected equal to approximately 30% of the length of a half period. The selection of this particular delay time provides greater efficiency when the inverter supplies power to an inductive load, such as an induction motor. Therefore, the delay t is approximately 2.5 milliseconds for a 60 Hz inverter. Three successive pulses are generated at equal intervals for the remainder of the half period. The gate signal 48 from pulse circuit and time delay 42 is identical with that from pulse circuit and time delay 41, but occurs during the positive half cycle of waveform 45 from the multivibrator inverted output 40.

The voltage at the anode of inverter switch 18 is represented by curve 49 and drops essentially to ground level at 49(a) upon occurrence of the initial pulse in gate signal 47 following time delay t. Inverter switch 18 continues to conduct until the occurrence of a pulse 43 from commutation trigger 34, which actuates the commutating circuitry. The voltage waveform 50 across inverter switch 19 is similar with conduction commencing at 50(a) upon the occurrence of the initial pulse in gate signal 48 and ending with pulse 46 from commutation trigger 35.

Commutation trigger circuit 34 provides pulse 43, approximately 10μ seconds in length, at the trailing edge of the noninverted waveform 44 to turn on commutation control switch 25, causing a discharge of capacitor 16 across inverter switch 18. Similarly, commutation trigger circuit 35 provides pulse 46 at the trailing edge of the inverted waveform 45 to turn commutation control switch 26 on.

Curve 51 represents the voltage across the secondary windings 28 of transformer 30. The exponential voltage rise 51(a) coincides with the start of current flow through the transformer. As commutating capacitor 16 is charged, waveform 53, the voltage across the secondary winding 28, falls back to zero.

Referring to FIG. 3, commutation trigger circuit 34 is shown. This circuit is identical to commutation trigger 35. Accordingly, only commutation trigger circuit 34 will be explained. Noninverted output 39 from the multivibrator 38 is coupled to resistors 60, 68K ohms, and 62, 200 ohms. Resistor 60 is connected to the anode of the programmable unijunction transistor 64, 2N 6027, and capacitor 66, 0.1μf. The gate of the programmable unijunction transistor 64 is connected to resistor 62. Resistor 62 limits the gate current through the programmable unijunction transistor 64. When waveform 44 goes negative, the gate of transistor 64 becomes negative with respect to the anode since the voltage across capacitor 66 cannot change instantaneously. This condition renders transistor 64 conductive. Thus, the programmable unijunction transistor 64 immediately turns on upon the reception of a trailing edge of waveform 40. The pulse length is determined by the selection of capacitor 66, and is typically 10μ seconds. The pulse is coupled to commutation control switch 26 through transformer 68.

Referring to FIG. 4, time delay and pulse circuit 42 is shown. This circuit is identical to pulse circuit and time delay 41 and, accordingly, only one of the two circuits will be explained. The purpose of time delay and pulse circuit 42 is to provide a series of pulses as a gate signal 48 to inverter switch 19 and commutating capacitor switch 20, after time delay t, when the waveform 45 makes its positive transition. The time delay t is established by the appropriate selection of resistor 70, 15K ohms, and variable resistor 72, 0–20K ohms, and capacitor 74, 0.056μf. The RC time constant of these components determines the rise time of the voltage at the anode of the programmable unijunction transistor 76, 2N 6027. The gate of transistor 76 is connected between resistor 78, 470 ohms, and resistor 80, 1,000 ohms. These two resistors provide a voltage divider network between the +V supply and ground and a constant voltage is therefore provided to the gate of transistor 76. When the voltage at the anode of transistor 76 exceeds the voltage at the gate, transistor 76 turns on, providing a positive voltage across resistor 82, 100 ohms. A positive voltage across resistor 82 turns transistor 84 on and the +V appears across resistor 86, 22 ohms. When transistor 76 is on, capacitor 74 discharges through resistor 82, causing the voltage at its anode to decrease. When the anode voltage decreases to a voltage level less than that of the gate, transistor 76 turns off. During the off condition of transistor 76, the output from the multivibrator 38 causes capacitor 74 to recharge. When the voltage at capacitor 74 exceeds the voltage level of the gate, transistor 76 turns on. This action recurs for the remaining length of the half period of the inverted output waveform 45. The adjustment of variable resistor 72 controls the number of pulses provided to SCR 19.

I claim:

1. In a full wave DC to AC inverter having
   a power transformer with primary and secondary windings, the primary winding having a center tap which defines two halves,
   means defining a ground reference potential,
   a battery coupled between the center tap of the primary winding and said ground reference potential,
   first and second SCR inverter switches, one connected between the end terminals of each half of the primary winding and ground, each switch when conductive completing a circuit for current flow from the battery through the associated half of the transformer primary winding,
   a timing signal source connected to the gate elements of each of said SCR inverter switches providing signals which cause said first and second inverter switches to conduct alternately, establishing an alternating current in the secondary winding of said transformer,
   an improved commutating circuit connected to the inverter switches to terminate conduction through the conducting one of the inverter switches prior to initiation of conduction through the other inverter switch, comprising:
   a commutating capacitor;
   a first and second commutation control switch coupled to the commutating capacitor, said first control switch being coupled to one end of the primary winding, the second control switch means coupled to the other end of the primary winding;
   a commutating capacitor charging transformer having a primary winding connected in series with the battery and the center tap of the primary winding of the power transformer and a secondary winding coupled to said commutating capacitor for charging the capacitor; and
   a commutation trigger responsive to the timing signal source and coupled to said first and second commutation control switches for causing discharge of the capacitor alternating across the first and the second inverter switches to terminate conduction therethrough.

2. In a full wave DC to AC inverter having
   a power transformer with primary and secondary windings, the primary winding having a center tap which defines two halves,
   means defining a ground reference potential,
   a battery coupled between the center tap of the primary winding and said ground reference potential,
   first and second SCR inverter switches, one connected between the end terminals of each half of the primary winding and ground, each switch when conductive completing a circuit for current flow from the battery through the associated half of the transformer primary winding,
   a timing signal source connected to the gate elements of each of said SCR inverter switches providing signals which cause said first and second inverter switches to conduct alternately, establishing an alternating current in the secondary winding of said transformer,
   an improved commutating circuit connected to both inverter switches to terminate conduction through the conducting one of the inverter switches prior to initiation of conduction through the other inverter switch, comprising:
   a commutating capacitor;
   a first and second SCR commutation control switch each connected to the commutating capacitor, the first SCR commutation control switch being connected to the terminal of the first SCR inverter switch that is connected to the end terminal of the primary winding, the second SCR commutation control switch being connected to the terminal of the second inverter switch that is connected to the other end of the primary winding;
   means for charging said commutating capacitor coupled with the battery and the center tap of the primary winding; and
   means coupled to the gate elements of the first and second SCR commutation control switches for rendering the first SCR commutation control switch conductive before the timing signal causes the first inverter switch to conduct and for rendering the second SCR commutation control switch conductive before the timing signal causes the second inverter switch to conduct, thereby discharging the commutation capacitor alternately across the first and the second inverter switch to terminate conduction therethrough.

3. The inverter of claim 2 wherein said commutating capacitor has one end thereof connected to ground and the other end connected to the first and to the second SCR commutation control switches.

4. The inverter of claim 2 wherein the commutating capacitor charging means includes a transformer having a primary winding connected in series with the battery and the center tap of the primary winding of said power transformer and a secondary winding having one terminal connected to the commutating capacitor and the other terminal controllably coupled to ground through an SCR switch, the gate element of said last mentioned SCR switch being coupled to the timing signal source to conduct when each of said SCR inverter switches conducts.

5. The inverter of claim 2 wherein the timing signal source has an oscillator with a frequency of twice the desired AC output and a multivibrator for providing an inverted and noninverted output at a frequency equal to one-half the frequency of the oscillator, the improvement comprising:
   a first pulse circuit and time delay means coupled to said noninverted output for providing a series of pulses after an established delay time to the first SCR inverter switch during each positive half period of the noninverted output; and
   a second pulse circuit and time delay means coupled to said inverter output for providing a series of pulses after an established delay time to the second SCR inverter switch during each positive half period of the inverted output.

6. The inverter of claim 5 wherein said established delay time is of the order of 30% of the period of the output, said delay time starting with the beginning of the half period.

7. The inverter of claim 5 wherein the first and the second pulse circuit and time delay means each comprise:
   variable resistor means in combination with a capacitor coupled between the output of the multivibrator and the anode of a programmable unijunction transistor;
   a voltage divider in combination with a voltage source and ground for establishing a voltage level at the gate of said programable unijunction transistor; and
   a transistor coupled to the cathode of the programable unijunction transistor so that when the programable unijunction transistor is successively rendered conductive, as a result of a voltage at the anode exceeding the voltage level at the gate, the transistor successively turns on to provide output pulses to the inverter switch.

8. The inverter of claim 5 wherein the means for rendering the first and second commutation control switches conductive includes two individual circuits, the first coupled to the noninverted output of the multivibrator and the second coupled to the inverted output of the multivibrator, each of the circuits comprising:
   two resistors coupled to the multivibrator output, one resistor coupled to the gate of a second programable unijunction transistor and the other coupled to the anode of the second programable unijunction transistor;
   a capacitor coupled to the anode of the programable unijunction transistor and to ground; and
   a transformer coupled between the cathode of the programable unijunction transistor and the gate of the SCR commutation control switch.

9. The inverter of claim 4 wherein a diode is connected across the primary winding of the commutating capacitor charging transformer.

10. The inverter of claim 5 further including two isolation diodes coupled between said first and second pulse circuits and time delay means and said first and second SCR inverter switches.

11. In a full wave DC to AC inverter having
   a power transformer with primary and secondary windings, the primary winding having a center tap which defines two halves,
   means defining a ground reference potential,
   a battery coupled between the center tap of the primary winding and said ground reference potential,
   first and second SCR inverter switches, one connected between the end terminals of each half of the primary winding and ground, each switch when conductive completing a circuit for current flow from the battery through the associated half of the transformer primary winding,
   a timing signal source connected to the gate elements of each of said SCR inverter switches providing signals which cause said first and second inverter switches to conduct alternately, establishing an alternating current in the secondary winding of said transformer,
   an improved commutating circuit connected to both inverter switches to terminate conduction through the conducting one of the inverter switches prior to initiation of conduction through the other inverter switch, comprising:
   a commutating capacitor, one end connected to ground;
   a first and a second SCR commutation control switch, each connected to the ungrounded end of the capacitor, the first SCR commutation control switch connected to the terminal of the first SCR inverter switch that is connected to the end terminal of the primary winding, the second SCR commutation control switch connected to the terminal of the second inverter switch that is connected to the other end of the primary winding;
   a commutating capacitor charging transformer having a primary winding connected in series with the battery and the center tap of the primary winding of said power transformer and a secondary winding having one terminal connected to the capacitor and the other terminal controllably couple to ground through an SCR commutating capacitor charging switch, the gate element of the commutating capacitor charging switch being coupled to the timing signal source to conduct when each of said SCR inverter switches conducts; and
   means coupled to the gate elements of the first and the second SCR commutation control switches for rendering the first SCR commutation control switch conductive before the timing signal causes the first inverter switch to conduct and for rendering the second SCR commutation control switch conductive before the timing signal causes the second inverter switch to conduct, thereby discharging the commutating capacitor alternately across the first and second inverter switches to terminate conduction therethrough.

* * * * *